United States Patent
Miras et al.

(10) Patent No.: US 10,461,860 B2
(45) Date of Patent: Oct. 29, 2019

(54) SCHEDULING METHOD FOR UPLINK AND DOWNLINK OF AN OPTICAL TRANSMISSION SYSTEM

(71) Applicant: COMMISSARIAT A L'ENERGIE ATOMIQUE ET AUX ENERGIES ALTERNATIVES, Paris (FR)

(72) Inventors: David Miras, Froges (FR); Luc Maret, Polienas (FR); Mickael Maman, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/038,701

(22) Filed: Jul. 18, 2018

(65) Prior Publication Data
US 2019/0028193 A1 Jan. 24, 2019

(30) Foreign Application Priority Data
Jul. 21, 2017 (FR) .................................... 17 56914

(51) Int. Cl.
| | | |
|---|---|---|
| H04B 10/116 | (2013.01) | |
| H04W 74/04 | (2009.01) | |
| H04B 10/114 | (2013.01) | |
| H04B 10/112 | (2013.01) | |
| H04B 10/40 | (2013.01) | |
| H04B 10/60 | (2013.01) | |
| H04B 10/50 | (2013.01) | |

(52) U.S. Cl.
CPC ....... *H04B 10/116* (2013.01); *H04B 10/1129* (2013.01); *H04B 10/1143* (2013.01); *H04B 10/1149* (2013.01); *H04W 74/04* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 2011/0105134 A1 | 5/2011 | Kim et al. | |
| 2011/0217044 A1 | 9/2011 | Kang et al. | |
| 2012/0224860 A1* | 9/2012 | Kim ..................... | H04B 10/116 398/128 |

(Continued)

OTHER PUBLICATIONS

French Preliminary Search Report dated Jun. 12, 2018 in French Application 17 56914 filed on Jul. 21, 2017 (with English Translation of Categories of Cited Documents).

(Continued)

*Primary Examiner* — Darren E Wolf
(74) *Attorney, Agent, or Firm* — Oblon, McClelland, Maier & Neustadt, L.L.P.

(57) ABSTRACT

A method of allocating transmission time slots in an optical wireless system. Resources are allocated taking account of asymmetry of interference diagrams on uplink and downlink and adopting reuse of transmission intervals for each channel, in areas in which there is no interference. In some embodiments, the allocation method allows for relaying between access points through the network to take account of the fact that the access point providing the best uplink (or downlink) can be distinct from the access point associated with the terminal.

11 Claims, 9 Drawing Sheets

(56) References Cited

U.S. PATENT DOCUMENTS

2014/0226977 A1\* 8/2014 Jovicic ................ H04B 10/116
 398/26
2016/0174241 A1\* 6/2016 Ansari ................. H04W 24/02
 370/329

OTHER PUBLICATIONS

Cheng Chen, et al., "Fractional Frequency Reuse in Optical Wireless Cellular Networks," IEEE $24^{th}$ International Symposium on Personal, Indoor, and Mobile Radio Communications: Special Sessions, 2013, pp. 3594-3598.
Sridhar Rajagopal, et al., "IEEE 802.15.7 VLC PHY/MAC Proposal Samsung/ETRI," IEEE 802.15 Wireless Personal Area Networks, Oct. 2009, pp. 1-121.

\* cited by examiner

SCHEDULING METHOD FOR UPLINK AND DOWNLINK OF AN OPTICAL TRANSMISSION SYSTEM

TECHNICAL DOMAIN

This invention relates to the domain of optical wireless communications in general, and particularly to Li-Fi (Light Fidelity) communication systems

STATE OF PRIOR ART

A great deal of research has recently been made on Optical Wireless Communications (OWC) systems due to their ability to solve the spectral occupancy problem and to complement or even replace Wi-Fi systems.

Schematically, Li-Fi systems are analogous to Wi-Fi systems (respecting IEEE standard 802.11) but use the visible spectrum instead of the RF spectrum. The physical (PHY) layer and the MAC layer of Li-Fi systems have already been standardised in IEEE standard 802.15.7.

To the extent that optical signals do not pass through opaque partitions, there is no interference between cells separated by such partitions. However, when Li-Fi cells are deployed in a free space, it is necessary to eliminate interference between adjacent cells.

A first technique for reducing interference between cells in an optical telecommunication system consists of adopting a frequency reuse pattern. Thus, the paper by C. Chen et al. entitled "Fractional frequency reuse in optical wireless cellular network" published in Proc. of the 2013 24th International Symposium on Personal, Indoor and Mobile Radio Communications, pp. 3594-3598, proposes that cells could be divided into a central region in which the entire band can be used, and a peripheral region affected by interference between cells, in which only sub-bands are used such that two peripheral zones of two adjacent cells are covered by distinct sub-bands.

A second interference management technique in optical telecommunication systems consists of detecting the position of users in space under light sources and then separating the light flow between these users in the time domain. Thus, two spatially separated users are served by spatially adapted cells at distinct instants. This technique was described in the proposal S. Rajagopal et al. entitled "IEEE 802.15.7 VLC PHY/MAC proposal-Samsung ETRI" IEEE Standard, Oct. 31, 2009. However it supposes that a large number of optical sources is deployed.

The above-mentioned techniques do not take account of asymmetry of interference that can occur between uplinks and downlinks.

Figure 1A:
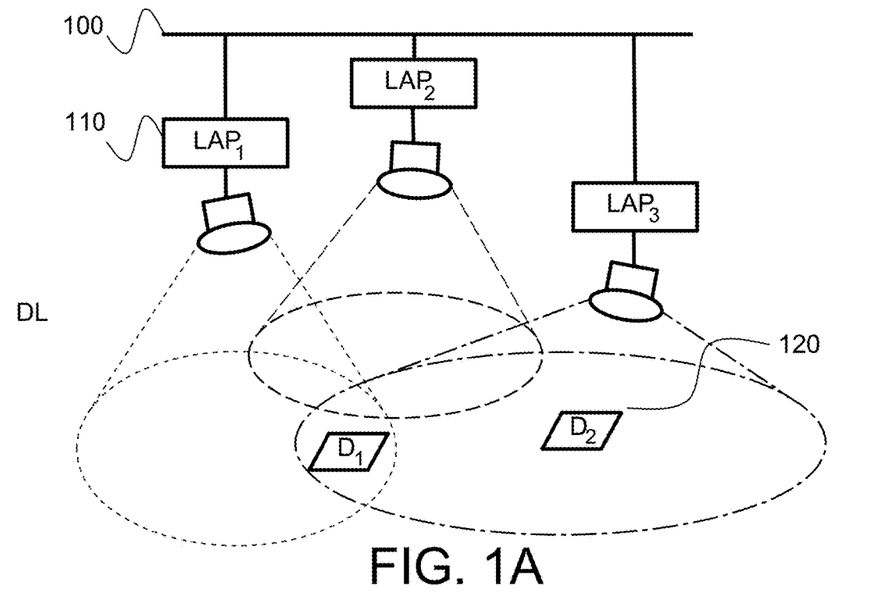
FIGS. 1A and 1B diagrammatically illustrate an example of an optical telecommunication system with asymmetry of interference on the uplink and the downlink.
Figure 1B:
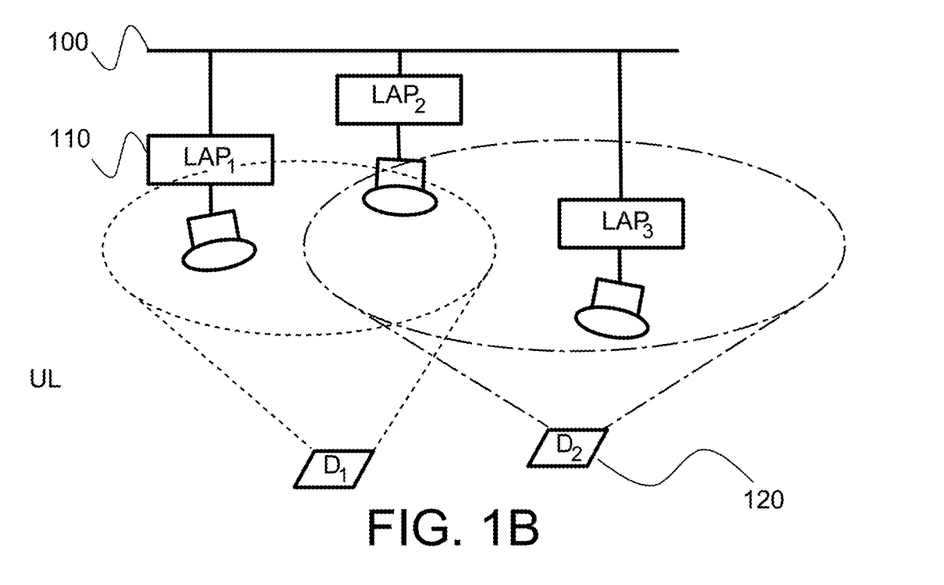

FIGS. 1A and 1B diagrammatically illustrate an example of an optical communication system with asymmetry of interference between the uplink and the downlink.

The optical telecommunication system comprises a plurality of light access points (APs) 110, connected to the main network 100, for example using Ethernet links. Each access is equipped with a modem coupled to a LED light source emitting in the visible range, the modem modulating the source power supply current so as to modulate the intensity of the light emitted.

The terminals 120 are equipped with a "dongle" including an optical receiver. This optical receiver receives the light signal, converts it into an electrical signal, demodulates it and recovers the transmitted data. Conversely, the dongle or the terminal itself is also equipped with an infrared diode, the data to be transmitted on the uplink being used to modulate the infrared signal. The infrared signal is received by a photodiode mounted on the access point, and is then demodulated to transmit the data through the principal network.

In the example shown, $LAP_1, LAP_2, LAP_3$ denote light access points and $D_1, D_2$ denote user terminals.

FIG. 1A illustrates optical coverage areas of each of the access points $LAP_1, LAP_2, LAP_3$. It can be seen that terminal $D_1$ is located in coverage areas of $LAP_1$ and $LAP_3$, and that terminal $D_2$ is located only in the coverage area of $LAP_3$. Thus, if terminal $D_1$ is associated with access point $LAP_1$, the signal emitted by $LAP_3$ on the downlink interferes with the downlink between $LAP_1$ and $D_1$.

FIG. 1B illustrates the corresponding interference situation on the uplink.

It will be noted that access point $LAP_2$ receives signals emitted by terminals $D_1$ and $D_2$ on the uplink, while there is no interference to signals received by $LAP_1$ and $LAP_3$ from $D_1$ and $D_2$ respectively.

In general, spatial distributions of coverage areas on the uplink and on the downlink are not symmetrical; the receiver can be at a distance from the emitter, the radiation diagram of the emitter and the reception diagram of the receiver are rarely equivalent (aiming angle, directivity). Furthermore, the use of refractive optical components such as lenses can increase the directivity of radiation diagrams that further accentuates the asymmetry of interference on the uplink and downlink.

In such an asymmetry situation, the same strategy for allocation of transmission resources on the uplink and on the downlink is sub-optimal.

Consequently, the purpose of this invention is to disclose a method of reducing interference in an optical wireless telecommunication system that is simple and efficient while taking account of asymmetry of interference on the uplink and the downlink.

PRESENTATION OF THE INVENTION

According to a first embodiment, this invention is defined by a method of allocating transmission time slots (hereinafter simply referred to as time slots) in an optical wireless system comprising a plurality of access points connected to a wired network and controlled by a network controller, and a plurality of terminals, in which:

- one access point among said plurality of access points is associated with each terminal, such that the average quality of the uplink and the downlink between this access point and said terminal is maximum;
- each terminal associated with an access point determines coverage information containing access point identifiers received by the terminal;
- when the coverage information of a terminal is reduced to the identifier of the access point associated with the terminal, the access point allocates a time slot to the downlink, within an available time range managed by the network controller ($CFP_{free}^{down}(AP_n)$);
- when the coverage information of a terminal includes a plurality of access point identifiers, the network controller allocates a time slot to the downlink between the terminal and its access point, within an available time range ($CFP_{free}^{down}(AP_n)$) and correspondingly eliminates the time slot thus allocated from the available time ranges of access points belonging to the coverage information.

Advantageously:
- each access point determines reception information containing terminal identifiers received by the access point;
- when the identifier of a terminal only appears in the reception information of the access point associated with it, this access point allocates a time slot to the uplink, within an available time range managed by the network controller ($CFP_{free}^{up}(AP_n)$);
- when the terminal identifier appears in a plurality of items of reception information, the network controller allocates a time slot to the uplink between the terminal and its associated access point, within an available time range ($CFP_{free}^{up}(AP_n)$) and at the same time eliminates the thus allocated time slot from the available time ranges for all access points containing the terminal identifier in their reception information.

According to a second embodiment, the invention is defined by a method of allocating time slots in an optical wireless system comprising a plurality of access points connected to a wired network and controlled by a network controller, and a plurality of terminals, in which:
- one access point among said plurality of access points is associated with each terminal, such that the quality of the uplink between said terminal and this access point is maximum;
- each terminal associated with an access point determines coverage information containing access point identifiers received by the terminal and quality indicators of the downlink with these access points, said coverage information being forwarded to the network controller through the access points;
- when the coverage information of a terminal is reduced to the identifier of the access point associated with the terminal, the access point allocates a time slot to the downlink, within an available time range managed by the network controller ($CFP_{free}^{down}(AP_n)$);
- when the coverage information comprises a plurality of access point identifiers, the network controller determines an auxiliary access point among said plurality such that the quality of the downlink between the auxiliary access point and the terminal is maximum, the downlink between the associated access point and the terminal comprising a first link through the wired network between the associated access point and the auxiliary access point and a second downlink between the auxiliary access point and the terminal;
- the network controller allocates a time slot to the second downlink between the auxiliary access point and the terminal, within an available time range ($CFP_{free}^{down}(AP_n)$) and at the same time eliminates the time slot thus allocated from the available time ranges for access points belonging to the coverage information.

According to a third embodiment, the invention is defined by a method of allocating time slots in an optical wireless system comprising a plurality of access points connected to a wired network and controlled by a network controller, and a plurality of terminals, in which:
- one access point among said plurality of access points is associated with each terminal, such that the quality of the downlink between this access point and said terminal is maximum;
- each access point determines reception information containing terminal identifiers received by the access point and quality indicators of the uplink with these terminals, said reception information being transmitted to the network controller;
- when the identifier of a terminal only appears in the reception information of the access point associated with it, this access point allocates a time slot to the uplink, within an available time range managed by the network controller ($CFP_{free}^{up}(AP_n)$);
- when a terminal identifier appears in a plurality of items of access point reception information, the network controller determines an auxiliary access point among said plurality such that the quality of the uplink between the terminal and this auxiliary access point is maximum, the uplink between the terminal and the associated access point comprising a first uplink between the terminal and the auxiliary access point and a second link in the wired network between the auxiliary access point and the associated access point.

Regardless of the embodiment, the optical system is preferably conforming with IEEE standard 802.15.7.

BRIEF DESCRIPTION OF THE DRAWINGS

Other features and advantages of the invention will become clear after reading a preferred embodiment of the invention, given with reference to the appended figures among which.

DETAILED PRESENTATION OF PARTICULAR EMBODIMENTS

We will consider in the following an optical wireless communication system (Li-Fi), as described for example in IEEE standard IEEE 802.15.7r1. This network comprises a plurality of access points connected to a backhaul network.

Figure 2:
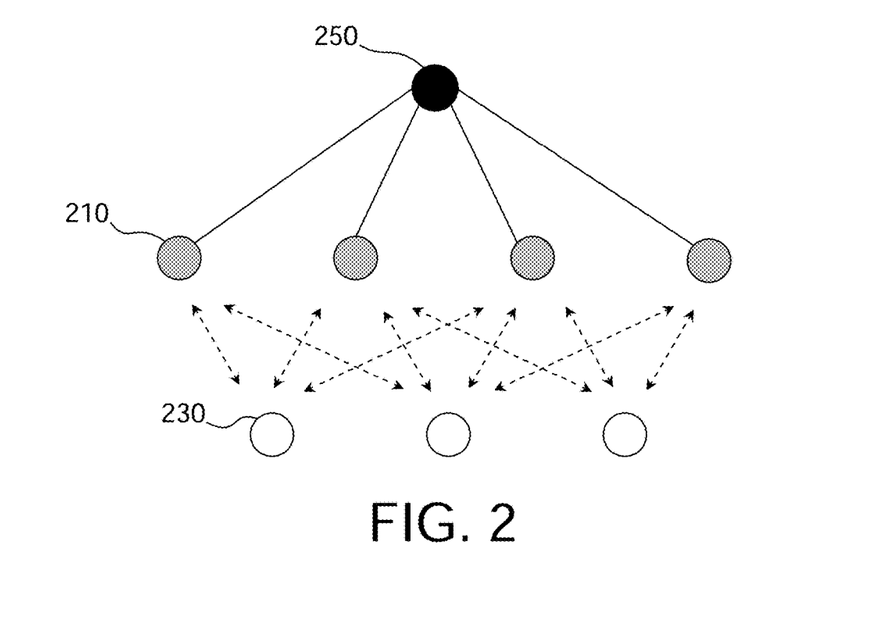
FIG. 2 diagrammatically shows an optical telecommunication system with a coordinated topology.

It is assumed that this network has a central interference management mechanism. As illustrated in FIG. 2, network access points (also called coordinators) 210, are connected to a global controller 250, by means of the backhaul network according to a coordinated topology, in the meaning of the above-mentioned standard. More precisely, each terminal 230 is capable of detecting interference between signals received from two access points and forwarding an interference report (a metric) to the network controller 250, through said access point. Similarly, each access point 210 can analyse the interference level between signals emitted by two terminals and transmit an interference report to the network controller 250. Depending on the interference ratios on the downlink and the uplink, the network controller transmits a time allocation of control signal time slots through the backhaul network, as described in detail below.

In particular, the function of the network controller is to emit superframes through the access points and allocate an access to the medium to them, based on a time division multi-access (TDMA) mechanism.

Figure 3:
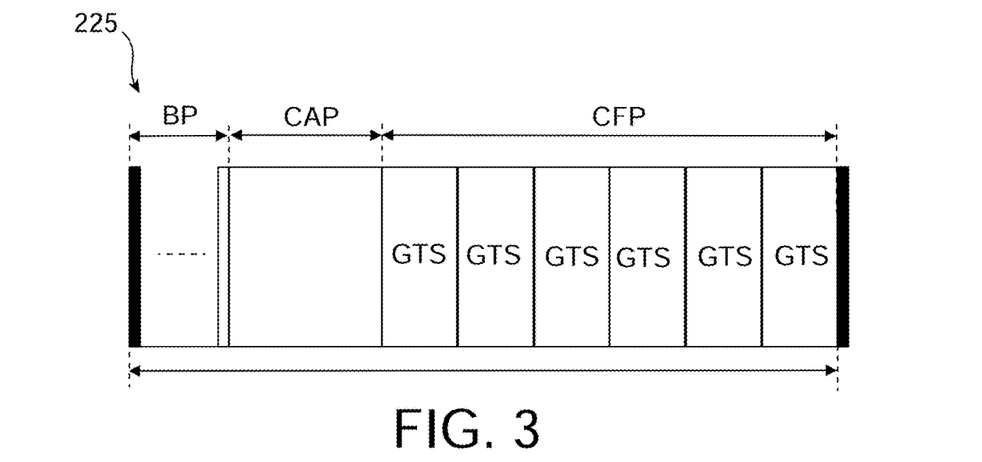
FIG. 3 diagrammatically represents the structure of a superframe used in an optical telecommunication system.

More precisely, transmission on the uplink/downlink uses a superframe structure like that shown in FIG. 3.

A superframe is delimited by successive beacons emitted by all access points (also called coordinators) synchronously. It is divided into three successive parts: a first part called the control period or beacon period (BP) dedicated to transmission of control messages (on the downlink and on the uplink) and a second part called the Contention Access Period (CAP) in which terminals can transmit at random and a third part called the Contention-Free Period (CFP), itself divided into Guaranteed Time Slots (GTSs) in which terminals and access points can transmit without a risk of access conflict on the uplink and downlink respectively.

Interference management is controlled by the network controller that firstly determines an interference table (or interference matrix) between access points. This interference matrix can be determined in advance starting from a survey of coverage areas during deployment of the different access points or can be built up as progress is made making use of interference reports forwarded by the terminals to the network controller through the access points.

The interference matrix is binary and is symmetrical. For each pair of access points controlled by the network controller, it indicates whether or not there is an intersection of coverage areas of these two access points (either on the uplink or the downlink). The absence or existence of such an intersection is represented by a binary value.

Interference can be detected on the downlink or on the uplink. On the downlink, interference between access points is detected from interference reports from terminals, forwarded to the network controller through these access points. On the uplink, interference is detected as soon as an access point receives a signal from a terminal that is not addressed to it. The interference report is then transmitted by the access point concerned to the network controller. When interference between access points is detected, either on the uplink or on the downlink, this interference is considered to be acquired even if it is no longer observed later. It is understood that this interference will only be detected if a terminal is in the intersection of access point coverage zones. The interference matrix thus keeps a time history trace of interference recorded between access points.

For example, considering the interference diagram between access points $AP_1$, . . . , $AP_6$ in FIG. 4A, the interference table will be given by:

|  | $AP_1$ | $AP_2$ | $AP_3$ | $AP_4$ | $AP_5$ | $AP_6$ |
| --- | --- | --- | --- | --- | --- | --- |
| $AP_1$ | X | 1 | 0 | 1 | 1 | 0 |
| $AP_2$ | 1 | X | 1 | 1 | 1 | 1 |
| $AP_3$ | 0 | 1 | X | 0 | 1 | 1 |
| $AP_4$ | 1 | 1 | 0 | X | 1 | 0 |
| $AP_5$ | 1 | 1 | 1 | 1 | X | 1 |
| $AP_6$ | 0 | 1 | 1 | 0 | 1 | X |

The interference table (or matrix) can be considered as an adjacency matrix of a graph called an incompatibilities graph, the vertices of which are network access points. According to this representation, two interfering access points on the downlink are represented by adjacent vertices in the incompatibilities graph.

Figure 4A:
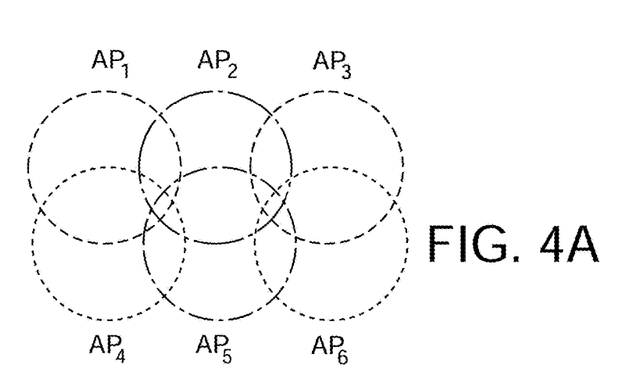
FIG. 4A diagrammatically represents an interference diagram between access points of an optical wireless telecommunication system.
Figure 4B:
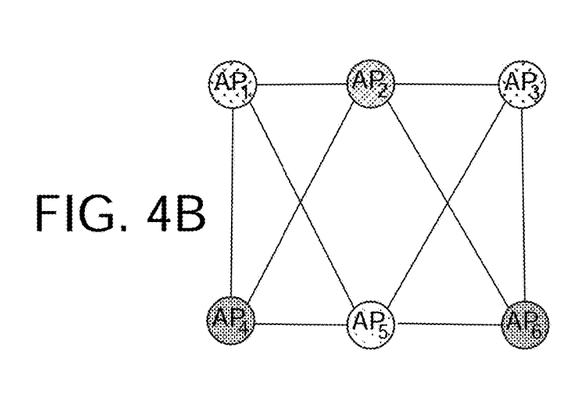
FIG. 4B represents an interference graph of access points for the optical wireless telecommunication system in FIG. 4A.

FIG. 4B represents the incompatibilities graph corresponding to the interference diagram in FIG. 4A.

The network controller attributes time slots (control signal time slots in the BP part, guaranteed time slots GTS in the CFP part) to the different access points, such that interfering access points are allocated separated time slots. When an access point does not interfere with any of its neighbours, it can allocate itself a time slot autonomously.

Time slots can be allocated by the network controller using a colouring algorithm of the incompatibilities graph. Colouring of a graph means that a colour is attributed to each vertex of the graph, while checking that two adjacent vertices cannot be the same colour. This can be achieved by using an equitable colouring algorithm known in the state of the art, for example the Welsh and Powell algorithm. Such an algorithm can assure that two adjacent vertices of the graph are coloured with different colours as illustrated in FIG. 4B. Advantageously, the number of different colours in the graph will be minimised.

Figure 4C:
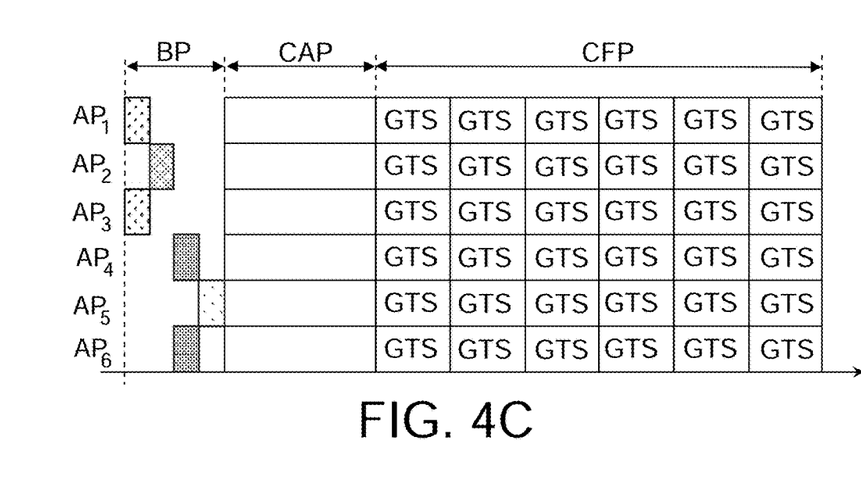
FIG. 4C represents an example allocation of time slots for the optical wireless telecommunication system in FIG. 4A.

FIG. 4C shows an example allocation of time slots, in accordance with the incompatibilities graph in FIG. 4B. Each row corresponds to an access point and represents a superframe transmitted on the downlink, comprising the BP, CAP and CFP parts. For example, it will be noted that the rows corresponding to access points $AP_1$ and $AP_3$ are the same colour: control signals can be transmitted on the downlink simultaneously with any risk of interference. On the other hand, the colour of the row corresponding to access point $AP_2$ is different from the colour corresponding to access points $AP_1$ and $AP_3$. Thus, $AP_2$ cannot transmit at the same time as $AP_1$ and $AP_3$ without the risk of creating interference for terminals located in the coverage area.

Control signal time slots are thus allocated to different access points within the superframe. Thus, for example, access points $AP_1$ and $AP_3$ can send their control messages during the first interval $BP_1$ of BP, access point $AP_2$ can send in the second interval $BP_2$ of BP, access points $AP_4$ and $AP_6$ can send in the interval $BP_3$ of BP, and finally access point $AP_5$ can send in the interval $BP_4$.

Figure 5:
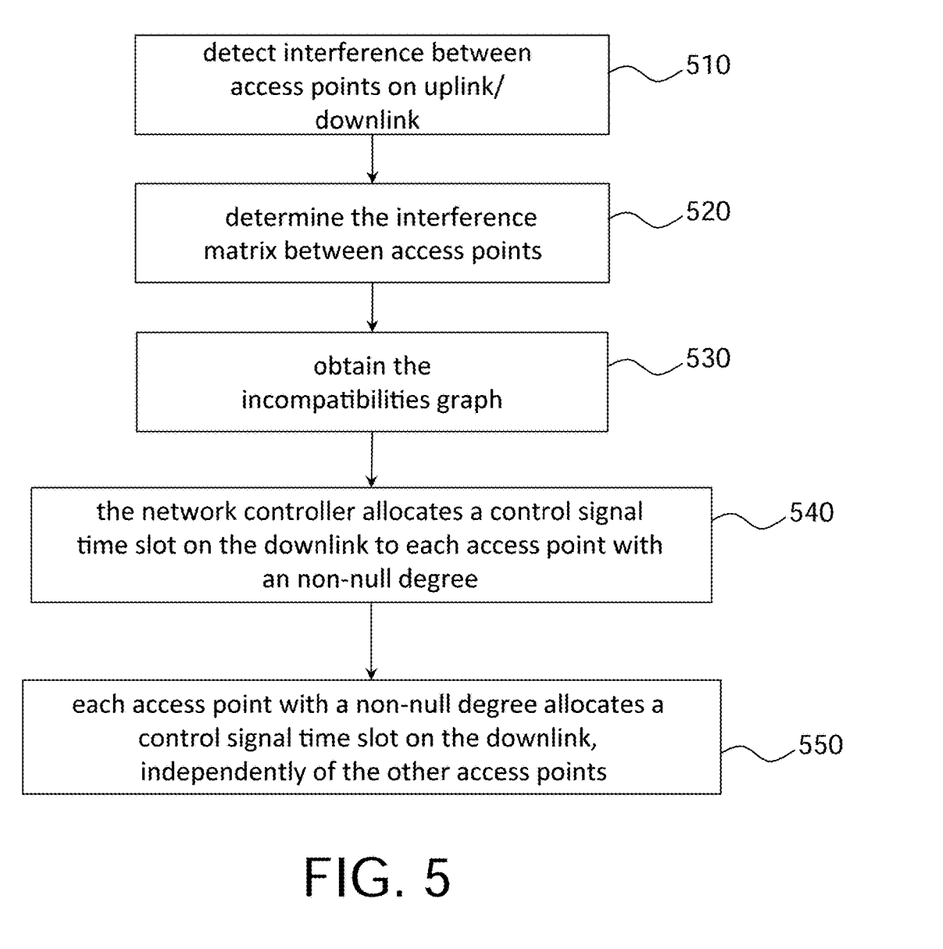
FIG. 5 represents the flow chart for allocation of control signal time slots in an optical wireless telecommunication system that can be used in any embodiment of the invention.

FIG. 5 represents the flow chart for allocation of time slots in an electronic wireless telecommunication system that can be used in any of the embodiments of the invention.

This first phase applies to the allocation of time slots during the control part (BP) of the superframe.

In step 510, interference is detected between access points on the downlink. This detection of interference is done by the network controller from interference reports (on the downlink) forwarded by terminals to the controller through the access points. Interference is also detected between access points on the uplink. This detection of interference is done by the network controller from interference reports (on the uplink) forwarded by these access points.

This step can have been performed for example during deployment of the network.

In step 520, the network controller determines an interference matrix between access points from previously detected interference. Detection of interference between access points on the uplink or the downlink corresponds to a first binary value in the matrix and a lack of interface corresponds to an inverse binary value.

In step 530, the network controller constructs an incompatibilities graph in which the vertices are the access points and the adjacency matrix of which is given by the interference matrix.

In step 540, the network controller allocates time slots on the downlink, to access points with a non-null degree on the graph. This allocation is made by colouring the incompatibilities graph obtained in the previous step: two access points with different colours are allocated separated time slots within the control part. Thus, two access points for which the coverage zones overlap are necessarily allocated separated time slots and two access points for which the coverage areas are separated can be allocated identical time intervals. Minimising the number of colours in the graph results in minimising the number of distinct time slots.

When an access point corresponds to a null degree node of the incompatibilities graph, the access point allocates time slots on the downlink in step 550, independently of other access points.

A terminal that wishes to connect to the network selects the access point that has the highest average quality of the downlink and the uplink. For example, the quality of a link can be estimated by means of a signal-to-noise metric. It then sends an association request to the selected access point in the reception slot reserved for this access point in the control part of the superframe.

The network controller can allocate guaranteed time slots (GTSs) to access points during the CFP (Contention-Free Period) part of the superframe, on the downlink. Similarly, the network controller can allocate guaranteed time slots to terminals during the CFP part of the superframe, on the uplink.

In this respect, it should be noted that a single guaranteed time slot can be allocated to the downlink and to the uplink of an access point, the uplink and the downlink being separated by the use of separated spectral ranges (for example visible on the downlink and infrared on the uplink).

Firstly, interference on the downlink is detected.

More precisely, each terminal determines which coverage area it is in.

This information (for example the list of detected access point identifiers), called terminal coverage information, is transmitted on the uplink and is supplied to the network controller.

If the terminal coverage information only comprises a single access point identifier, it is concluded that there is no interference on the downlink. The access point in question can then autonomously (in other words without referring to the network controller) allocate a guaranteed time slot on the downlink to the terminal. In other words, the access point can autonomously manage the allocation of GTS time slots on the downlink in its own coverage area, in other words not shared with the coverage area of a neighbouring access point. However, this autonomous allocation can only be made within the area of the CFP part not already allocated by the network controller, called $CFP_{free}^{down}(AP_n)$ defined below. Obviously, within this area, the time slot must not have been allocated to another downlink by the access point.

On the other hand, if the coverage information comprises several access point identifiers, in other words if the terminal is in an interference area between downlinks, the guaranteed time slot is allocated by the network controller.

The network controller manages the area $CFP_{free}^{down}(AP_n)$ of the CFP part for each access point $AP_n$.

Before starting allocation, in other words before setting up a downlink, each access point can use an available time range equal to the entire CFP part of the superframe, $CFP_{free}^{down}(AP_n)=CFP$.

When the network controller allocates a guaranteed time slot (GTS) to the terminal on the downlink, it can only do this by reducing the available time range $CFP_{free}^{down}(AP_n)$ for the access point. When this allocation has been made, the network controller eliminates the time slot thus allocated from the available time ranges (downlink) $CFP_{free}^{down}(AP_m)$, of access points $AP_m$ appearing in the coverage information of the terminal.

In practice, the network controller has a first memory area representing the available time range (downlink) for each access point. This memory area is divided into the same number of sections as the number of time slots in the CFP area. When a time slot is allocated to an access point for a downlink to a terminal, the identifier of the access point is stored in the corresponding sections of the first memory areas of access points appearing in the coverage information of the terminal. Conversely, when the downlink between the access point and the terminal is broken, the identifier of the access point is deleted from the corresponding sections concerned and the time ranges are increased by the previously allocated time slot. Thus, when a section of the first memory area of an access point $AP_n$ does not contain any access point identifier, it can be concluded that it forms part of the available time range $CFP_{free}^{down}(AP_n)$.

Interference on the uplink is detected in a similar manner. More precisely, each access point determines a list of terminal identifiers that it receives on the uplink, hereinafter called reception information.

When the identifier of terminal D only appears in the reception information of the access point associated with it, the guaranteed time slot can be allocated autonomously by this access point.

Otherwise, there will be interference on the uplink and the network controller is responsible for making the allocation. When the network controller allocates a guaranteed time slot (GTS) to the uplink between a terminal D and the access point $AP_n$ with which it is associated, it can only do it within the available time range (uplink), $CFP_{free}^{up}(AP_n)$, relative to the access point $AP_n$ concerned. When this allocation has been made, the network controller eliminates the time slot thus allocated from the available time ranges (downlink), $CFP_{free}^{up}(AP_m)$, of access $AP_m$ for which the association information includes the identifier of terminal D.

In practice, as for the downlink, the network controller has a second memory area representing the available time range (uplink) for each access point. This memory area is divided into one section for each time slot in the CFP area, each section containing the identifier of the terminal to which the corresponding time slot is allocated.

When a time slot is allocated to an uplink, the terminal identifier is stored in the corresponding sections of the second memory areas of access points for which the reception information contains the terminal identifier. Conversely, when the uplink between the terminal and the access point is broken, the terminal identifier is deleted from the corresponding sections concerned. Thus, when a section of the second memory area of an access point $AP_n$ does not contain any terminal identifier, it can be concluded that it forms part of the available time range (uplink) $CFP_{free}^{up}(AP_n)$ of the latter.

Figure 6A:
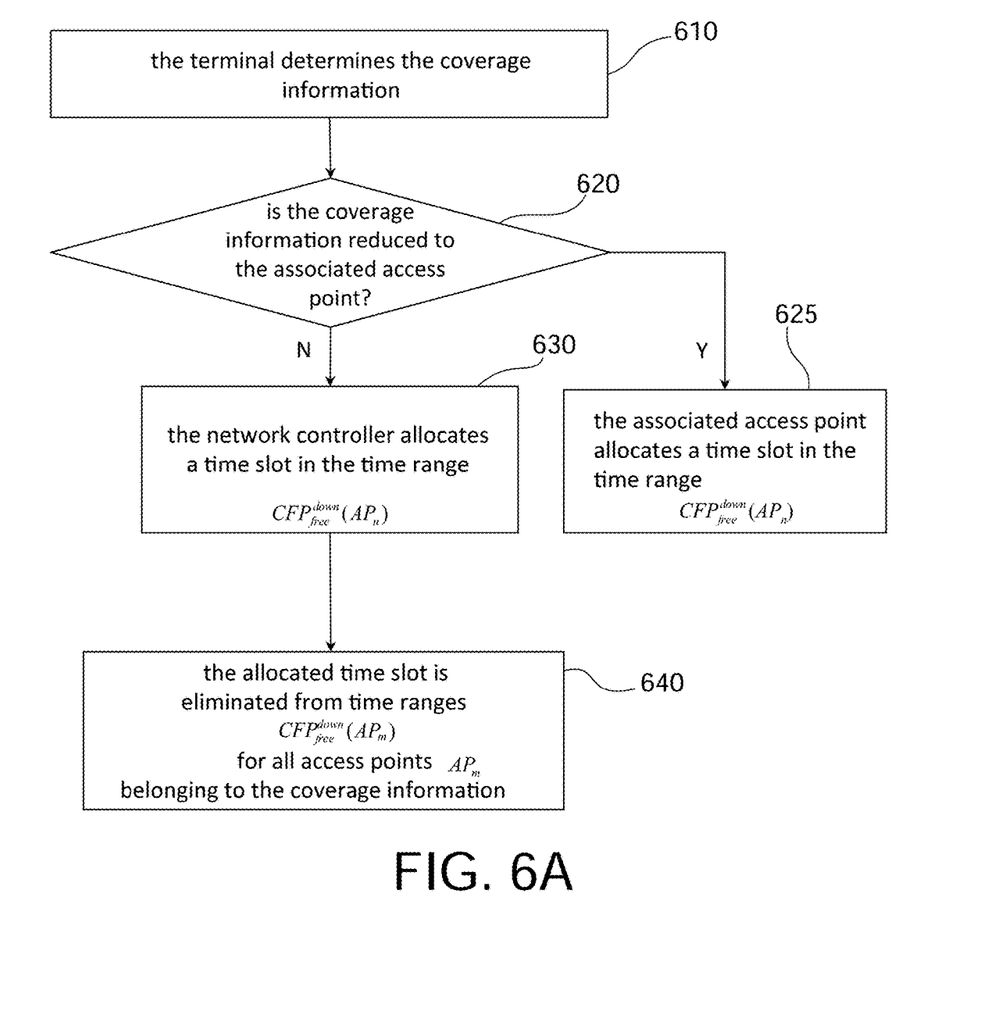
FIG. 6A represents the flow chart for a method of allocating time slots for downlinks of an optical wireless telecommunication system, according to a first embodiment of the invention.

FIG. 6A represents the flow chart for a method of allocating time slots for downlinks in an electronic wireless telecommunication system according, to the first embodiment of the invention.

A downlink is considered between an access point $AP_n$ and a terminal D.

In step 610, the terminal D determines its coverage information (list of identifiers of detected access points) and transmits it to the network controller.

In step 620, it is determined if the coverage information is reduced to the access point $AP_n$ associated with it.

If it is, in 625 the access point $AP_n$ allocates a time slot in the time range $CFP_{free}^{down}(AP_n)$ to the downlink.

If it is not, the allocation is made by the network controller. In step 630, the network controller allocates a time slot to the downlink within the time range $CFP_{free}^{down}(AP_n)$.

In step 640, the network controller eliminates the allocated time slot from the time ranges $CFP_{free}^{down}(AP_m)$ relative to access nodes $AP_m$ present in the coverage information of the terminal, and therefore in particular from the time range $CFP_{free}^{down}(AP_n)$ for the associated access point.

Figure 6B:
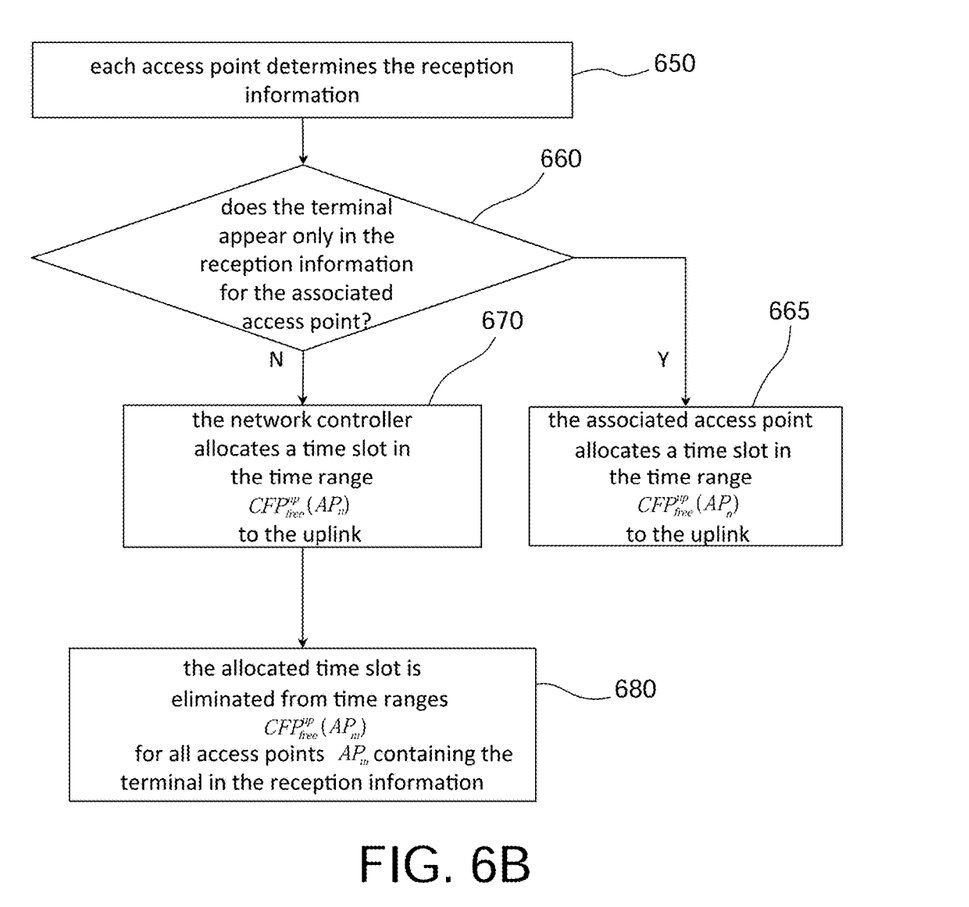
FIG. 6B represents flowchart for a method of allocating time slots for uplinks of an optical wireless telecommunication system, according to a first embodiment of the invention.

FIG. 6B represents the flow chart for a method of allocating time slots for uplinks in an electronic wireless telecommunication system, according to the first embodiment of the invention;

An uplink is considered between a terminal D and an access point $AP_n$.

In step 650, each access point determines its reception information (list of identifiers of detected terminals) and transmits it to the network controller.

In step 660, it is determined if the identifier of terminal D only appears in the reception information for the access point that is associated with it, $AP_n$.

If this is the case, in 665 the access point $AP_n$ allocates a time slot in the time range $CFP_{free}^{up}(AP_n)$ to the uplink.

If this is not the case, the allocation is made by the network controller. In step 670, the network controller allocates a time slot to the uplink within the time range $CFP_{free}^{up}(AP_n)$.

In step 680, the network controller amputates the time ranges $CFP_{free}^{up}(AP_m)$ relative to access nodes $AP_m$ for which the reception information contains the identifier of terminal D, of the time slot thus allocated, and therefore in particular the time range $CFP_{free}^{up}(AP_n)$ for the access point $AP_n$ associated with it. By amputation of a time range $CFP_{free}^{up}(AP_m)$ of a time slot, it is meant that this time slot is eliminated from the time $CFP_{free}^{up}(AP_m)$ and that the rest of this time range is retained.

Figure 7:
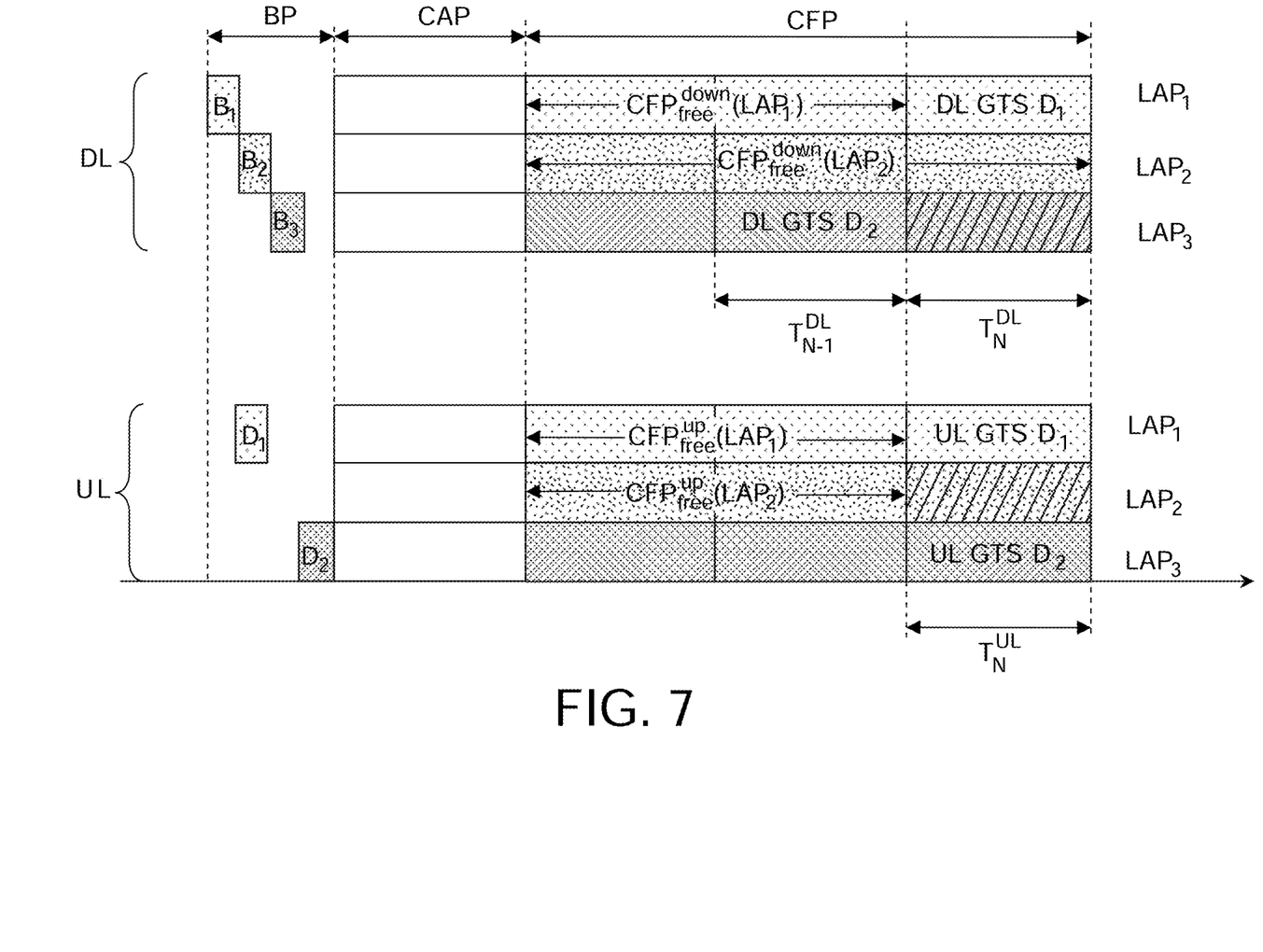
FIG. 7 represents application of the time slots method according to the first embodiment of the invention, to the optical wireless telecommunication system in FIGS. 1A and 1B.

FIG. 7 represents an application of the method of allocating time slots according to the first embodiment of the invention, to the optical wireless telecommunication system in FIGS. 1A and 1B.

This figure shows the allocation of time slots in a superframe, indicating the BP, CAP and CFP parts of this superframe.

The upper part of the figure also shows the allocation of time slots on the downlink (DL) and the lower part of the figure shows the allocation of time slots on the uplink (UL).

Concerning the control part (BP) of the superframe, it can be seen that each access point has a control signal time slot ($B_1, B_2, B_3$) on the downlink that is consistent with the interference diagram in FIG. 1A, each coverage area intersecting the other two areas.

Similarly, on the uplink, a control signal time slot is allocated to each terminal $D_1, D_2$). It will be seen that no control signal time slot is attributed in relation to the access point $LAP_2$ as no uplink is associated with this access point.

Concerning the CFP part of the superframe, it can be seen that for the downlink, the access point $LAP_1$ can use its entire available time range outside the data time slot (downlink), $T_N^{DL}$, that was allocated to it by the network controller to communicate with $D_1$. In other words, $CFP_{free}^{down}(LAP_1) = CFP\backslash T_N^{DL}$.

This time slot was correspondingly deleted from available time ranges (downlink) for access points appearing in the coverage information of terminal $D_1$, namely $\{LAP_1, LAP_3\}$. The access point $LAP_2$ can use its entire available time range provided that it does not appear in the coverage information for terminal $D_1$ nor in the coverage information for terminal $D_2$, in other words $CFP_{free}^{down}(LAP_2) = CFP$. The available time range for access point $LAP_3$ is amputated of $T_N^{DL}$ as indicated above, namely $CFP_{free}^{down}(LAP_3) = CFP\backslash T_N^{DL}$. The time slot $TN_{N-1}^{DL}$ is allocated by $LAP_3$ within the available time range $CFP_{free}^{down}(LAP_3)$ to communicate with $D_2$. Since the coverage information of terminal $D_2$ is limited to $\{LAP_3\}$, there is no need to eliminate this time slot from the available time ranges of $LAP_1$ and $LAP_2$.

On the uplink, the network controller allocates the data time slot $T_N^{UL}$ to terminal $D_1$ to communicate with $LAP_1$. Since the reception information of $LAP_2$ namely $\{D_1, D_2\}$, contains the identifier of terminal $D_1$, this time slot is eliminated from the available time range (uplink) of $LAP_3$, in other words $CFP_{free}^{up}(LAP_2) = CFP\backslash T_N^{UL}$. On the other hand, since the reception information of $LAP_3$, namely $\{D_2\}$, does not contain the identifier of terminal $D_1$, the time slot $T_N^{UL}$ is not eliminated from the available time range (uplink) of $LAP_3$.

Similarly, the network controller allocates the time slot $T_N^{UL}$ to terminal $D_2$ for the uplink with $LAP_3$. Since the reception information of $LAP_2$, namely $\{D_1, D_2\}$, contains the identifier of terminal $D_2$, this time slot must correspondingly be eliminated from the available time range (uplink) of $LAP_2$, $CFP_{free}^{up}(LAP_2) = CFP\backslash T_N^{UL}$. It will be noted that the section corresponding to $T_N^{UL}$ in the second memory area of access point $LAP_2$ contains identifiers of $D_1, D_2$. However, breaking one of the uplinks $D_1$–$LAP_1$, $D_2$–$LAP_3$ does not free the time slot $T_N^{UL}$ since the identifier of the terminal for which the link is not broken remains stored in the section concerned.

In a second embodiment, it is assumed that the association of an access point to the terminal is based only on the quality of the uplink.

In this case, in addition to the terminal identifiers, the reception information includes link quality indicators as measured by the access point. The access point providing the highest quality uplink is chosen to be associated with the terminal.

In step 610, the terminal not only detects identifiers of access points, but it also measures the quality of signals (signal/noise ratios) received from these access points. In other words, the coverage information transmitted by a terminal to the network controller contains not only the list of access points visible from the terminal, but also quality indicators of downlinks that could be made with these access points.

The next step is to determine which of the access points appearing in the coverage information has the best downlink quality indicator. If the access point selected to make the downlink is the same as the access point selected to make the uplink, the situation is the same as the situation described with reference to FIG. 6A. On the other hand, if this access point is different, the downlink is made using a first link through the Ethernet network, between the associated access point and the access point with the best downlink quality indicator, called the auxiliary access point, and a second link between this auxiliary access point and the terminal. In this case, an optimum link quality is obtained on both the uplink and the downlink. It will thus be understood that the access point associated with the terminal (and communicating with the terminal in the control period BP) is dissociated from the downlink access point to which the time slot is allocated.

Figure 8:
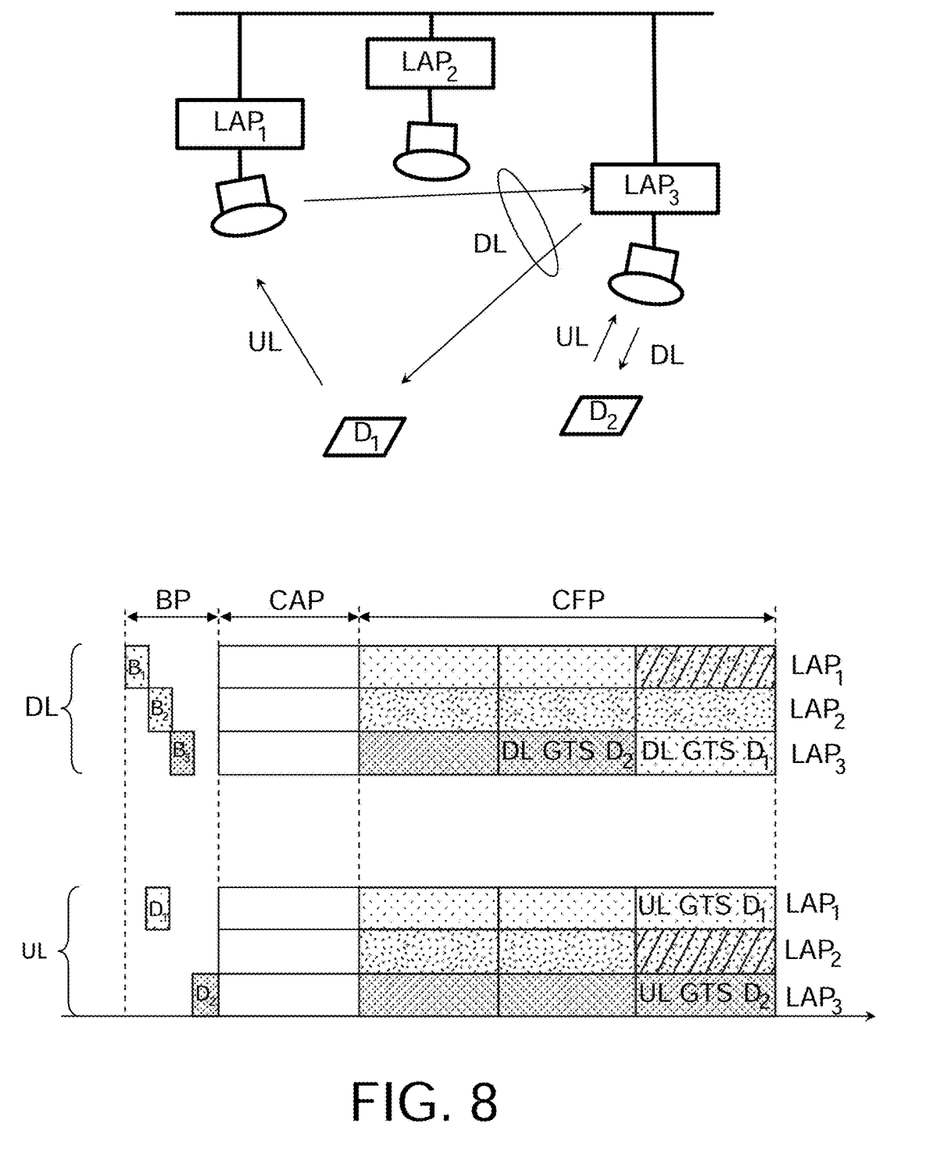
FIG. 8 represents application of a method of allocating time slots according to a second embodiment of the invention, to the optical wireless telecommunication system in FIGS. 1A and 1B.

FIG. 8 represents an application of the method of allocating time slots according to this second embodiment, to the optical wireless telecommunication system in FIGS. 1A and 1B.

The upper part of the figure diagrammatically shows the uplink and the downlink between terminal $D_1$ and access point $LAP_1$. The uplink between $D_1$ and $LAP_1$ is the uplink that gives the best link quality. On the other hand, on the downlink, the quality of the link between $LAP_3$ and $D_1$ is better in this case than the link between $LAP_1$ and $D_1$. Thus, the selected downlink is composed of a first link through the wire network (Ethernet) between $LAP_1$ and $LAP_3$ and a second link (optical wireless) between $LAP_3$ and $D_1$.

The lower part of the figure shows the allocation of time slots. It can be seen that this allocation on the uplink is the same as that shown in FIG. 7. On the other hand, on the downlink, a data time slot is allocated to the link between $LAP_3$ and $D_1$ instead of being allocated to a link between $LAP_1$ and $D_1$. The data flow is still transmitted through $LAP_1$ but is relayed to $LAP_3$ through the network that transmits it to $D_1$.

In a third embodiment, it is assumed that the association of an access point with the terminal is based only on the quality of the downlink. In this case, in addition to the access point identifiers, the coverage information includes link quality indicators as measured by the terminal. The access point providing the highest quality downlink is chosen to be associated with the terminal.

In this case, in step 650, the access points not only detect identifiers of terminals, but also measure the quality of signals (signal/noise ratios) received from these terminals. In other words, the reception information transmitted by an access point to the network controller contains not only the list of terminals visible from the access point, but also quality indicators of uplinks that could be made with these access points.

The next step is to determine which of the access points containing the terminal identifier in their reception information has the best uplink quality indicator. If the access point selected to make the uplink is the same as the access point chosen to make the downlink, the situation is the same as the situation described with reference to FIG. 7. On the other hand, if this access point is different, the uplink is made using a first link between the terminal and the access point with the best uplink quality indicator, called the auxiliary access point, and a second link through the Ethernet network, between this auxiliary access point and the associated access point. In this case, an optimum link quality is obtained on both the downlink and the uplink. It will thus be understood that the access point associated with the terminal (and communicating with the terminal in the control period BP) is dissociated from the uplink access point, in other words the access point to which the time slot is allocated and through which the data transit.

Figure 9:
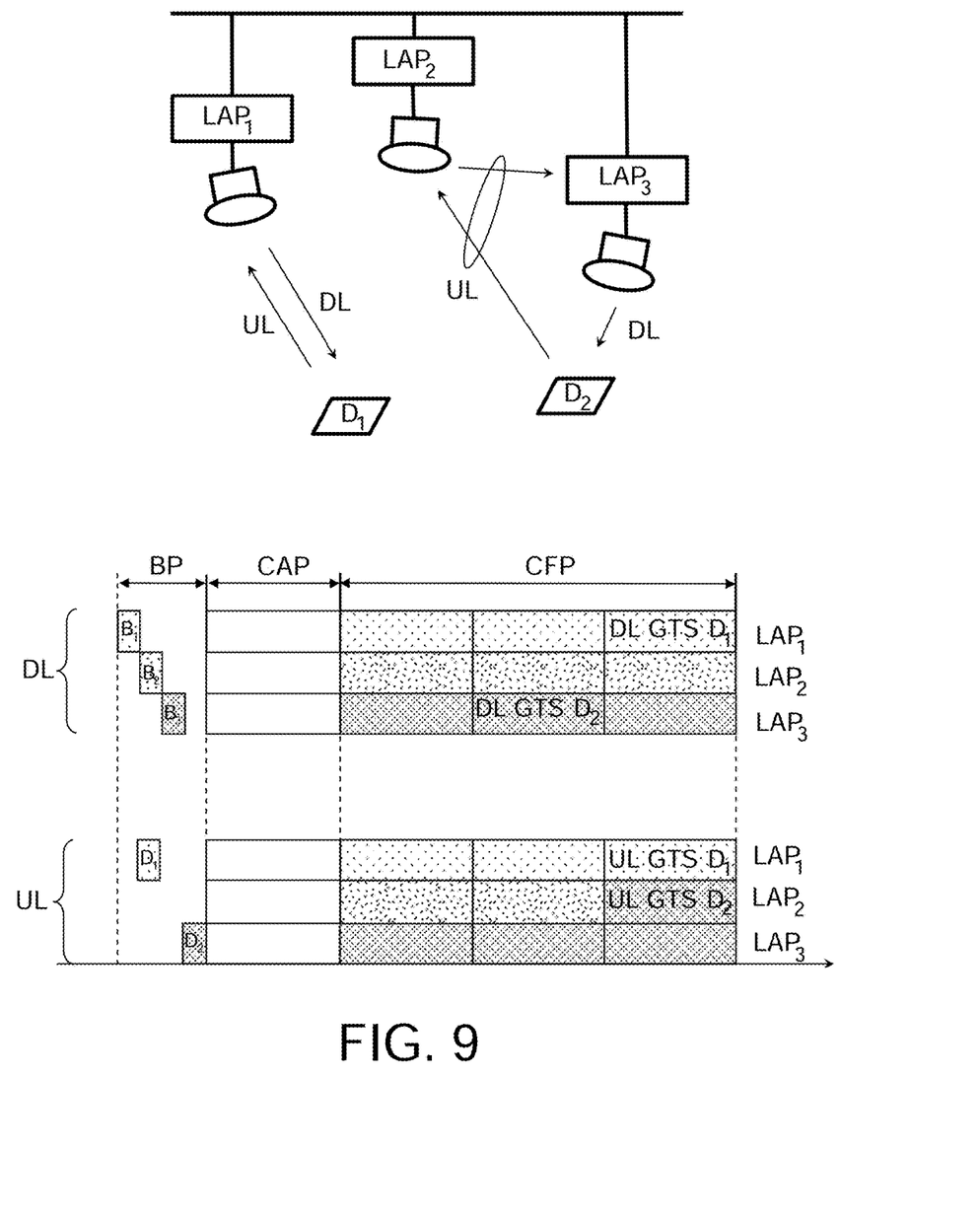
FIG. 9 represents application of a method of allocating time slots, according to a third embodiment of the invention, to the optical wireless telecommunication system in FIGS. 1A and 1B.

FIG. 9 represents an application of the method of allocating time slots according to the second embodiment, to the optical wireless telecommunication system in FIGS. 1A and 1B.

The upper part of the figure diagrammatically shows the uplink and the downlink between terminal $D_2$ and access point $LAP_3$. The downlink between $LAP_3$ and $D_2$ is the downlink that gives the best link quality. On the other hand, on the uplink, the link between $D_2$ and $LAP_2$ is better in this case than the link between $D_2$ and $LAP_3$. Thus, the selected uplink is composed of a first (optical wireless) link between $D_2$ and $LAP_2$ and a second link through the wire network (Ethernet) between $LAP_2$ and $LAP_3$.

The lower part of the figure shows the allocation of time slots. It can be seen that this allocation on the downlink is the same as that shown in FIG. 7. On the other hand, on the uplink, a data time slot is allocated to the link between $D_2$ and $LAP_2$ instead of being allocated to a link between $D_2$ and $LAP_3$. The data flow transmitted to $LAP_2$ is then relayed by the latter to $LAP_3$ through the Ethernet network.

According to a fourth embodiment, the access point associated with the terminal is chosen based on an average of the quality of the uplink and the quality of the downlink, the quality of a link being estimated for example based on a metric of the signal-to-noise ratio or an error rate. In this case, the access point corresponding to the best downlink quality and the access point corresponding to the best uplink quality can both be different from the access point associated with the terminal. A time slot is then allocated for a first auxiliary access point on the downlink, in accordance with the second embodiment, and for a second auxiliary access point on the uplink, in accordance with the third embodiment. Finally, the associated access point is then only used for control signals and messages.

The invention claimed is:

1. A method of allocating transmission time slots in an optical wireless system including (1) a plurality of access points each having a corresponding access point identifier, connected to a wired network and controlled by a network controller, and (2) a plurality of terminals, each having a corresponding terminal identifier, the method comprising:
   associating an access point among said plurality of access points with each terminal of the plurality of terminals, such that an average quality of an uplink and a downlink between the associated access point and said each terminal is maximum;
   determining, via each terminal of the plurality of terminals associated with each of the plurality of access points, coverage information containing access point identifiers of access points of the plurality of access points received by the each terminal; and
   allocating downlink transmission time slots to each terminal of the plurality of terminals according to:
      when the coverage information of the each terminal includes only the access point identifier of the associated access point associated with the each terminal, allocating via the associated access point a downlink transmission time slot to the downlink between the each terminal and its associated access point, within an available time range managed by the network controller ($CFP_{free}^{down}(AP_n)$);
      when the coverage information of the each terminal includes a plurality of the access point identifiers, allocating via the network controller a downlink transmission time slot to the downlink between the each terminal and its associated access point, within an available time range ($CFP_{free}^{down}(AP_n)$) and correspondingly eliminating the downlink transmission time slot thus allocated from the available time ranges of access points belonging to the coverage information of the each terminal.

2. The method of allocating transmission time slots according to claim 1, further comprising:
receiving, by each access point of the plurality of access points, reception information containing terminal identifiers of terminals of the plurality of terminals that can transmit to the each access point; and
allocating uplink transmission time slots to each terminal of the plurality of terminals according to:
when the terminal identifier of the each terminal only appears in the reception information of its associated access point, allocating, by the associated access point, an uplink time slot to the uplink between the each terminal and its associated access point, within an available time range managed by the network controller ($CFP_{free}^{up}(AP_n)$);
when the terminal identifier of the each terminal appears in a plurality of items of reception information, allocating, by the network controller, an uplink transmission time slot to the uplink between the each terminal and its associated access point, within an available time range ($CFP_{free}^{up}(AP_n)$) and eliminating the downlink transmission time slot thus allocated from available time ranges for all access points of the plurality of access points containing the terminal identifier of the each terminal in their reception information.

3. A method of allocating transmission time slots in an optical wireless system including (1) a plurality of access points each having a corresponding access point identifier, connected to a wired network, and controlled by a network controller, and (2) a plurality of terminals each having a corresponding terminal identifier, the method comprising:
associating an access point among said plurality of access points with each terminal of the plurality of terminals, such that a quality of an uplink between said each terminal and the associated access point is maximum;
determining, via each terminal of the plurality of terminals associated with each of the plurality of access points, coverage information containing access point identifiers received by the each terminal and quality indicators of downlinks with access points corresponding to the access point identifiers, said coverage information being forwarded to the network controller through the access points corresponding to the access point identifiers;
allocating downlink transmission time slots to each terminal of the plurality of terminals according to:
when the coverage information of the each terminal includes only the access point identifier of the associated access point associated with the each terminal, allocating via the associated access point a downlink transmission time slot to the downlink between the each terminal and its associated access point, within an available time range managed by the network controller ($CFP_{free}^{down}(AP_n)$);
when the coverage information of the each terminal includes a plurality of the access point identifiers:
(1) determining via the network controller an auxiliary access point among said plurality of access points such that a quality of the downlink between the auxiliary access point and the each terminal is maximum, the downlink between the associated access point and the each terminal comprising a first link through the wired network between the associated access point and the auxiliary access point and a second link between the auxiliary access point and the each terminal;
(2) allocating via the network controller a transmission time slot to the second link, within an available time range ($CFP_{free}^{down}(AP_n)$), and
(3) eliminating the time slot thus allocated from available time ranges of access points belonging to the coverage information.

4. A method of allocating transmission time slots in an optical wireless system including (1) a plurality of access points each having a corresponding access point identifier, connected to a wired network, and controlled by a network controller, and (2) a plurality of terminals, each having a corresponding terminal identifier, the method comprising:
associating an access point among said plurality of access points with each terminal of the plurality of terminals, such that a quality of a downlink between the associated access point and said each terminal is maximum;
determining, via each access point of the plurality of access points, reception information containing terminal identifiers of the plurality of terminal identifiers received by the each access point and quality indicators of an uplink with terminals of the plurality of terminals having terminal identifiers in said reception information, said reception information being transmitted to the network controller;
allocating uplink transmission time slots to each terminal of the plurality of terminals according to:
when the terminal identifier of the each terminal only appears in the reception information of its associated access point, allocating via the associated access point a transmission time slot to the uplink, within an available time range managed by the network controller ($CFP_{free}^{up}(AP_n)$);
when the terminal identifier of the each terminal appears in a plurality of items of access point reception information, determining via the network controller an auxiliary access point among said plurality of access points such that the quality of the uplink between the each terminal and the auxiliary access point is maximum, the uplink between the each terminal and the associated access point comprising a first link between the each terminal and the auxiliary access point and a second link in the wired network between the auxiliary access point and the associated access point.

5. The method of allocating transmission time slots in an optical wireless system according to claim 1, wherein said optical system complies with IEEE standard 802.15.7.

6. The method of allocating transmission time slots in an optical wireless system according to claim 3, wherein said optical system complies with IEEE standard 802.15.7.

7. The method of allocating transmission time slots in an optical wireless system according to claim 4, wherein said optical system complies with IEEE standard 802.15.7.

8. The method of allocating transmission time slots in an optical wireless system according to claim 1, further comprising:
transmitting optical signals between the plurality of access points and the plurality of terminals according to the downlink transmission time slots allocated to the plurality of terminals.

9. The method of allocating transmission time slots in an optical wireless system according to claim 2, further comprising:

transmitting optical signals between the plurality of terminals and the plurality of access points according to the uplink transmission time slots allocated to the plurality of terminals.

10. The method of allocating transmission time slots in an optical wireless system according to claim 3, further comprising:

transmitting optical signals between the plurality of access points and the plurality of terminals according to the downlink transmission time slots allocated to the plurality of terminals.

11. The method of allocating transmission time slots in an optical wireless system according to claim 4, further comprising:

transmitting optical signals between the plurality of terminals and the plurality of access points according to the uplink transmission time slots allocated to the plurality of terminals.

* * * * *